United States Patent [19]

Hayes

[11] Patent Number: 5,040,456
[45] Date of Patent: Aug. 20, 1991

[54] SCREEN PRINTING FRAME

[75] Inventor: James J. Hayes, Queens Village, N.Y.

[73] Assignee: U.S. Graphics Ltd., Queens Village, N.Y.

[21] Appl. No.: 613,605

[22] Filed: Nov. 9, 1990

[51] Int. Cl.$^5$ ............................................. B41L 13/00
[52] U.S. Cl. ................................ 101/127.1; 160/381; 403/402
[58] Field of Search ................... 101/127.1, 128, 128.1; 160/369, 371, 381; 403/401, 402, 295

[56] References Cited

U.S. PATENT DOCUMENTS

| | | | |
|---|---|---|---|
| 2,989,788 | 6/1961 | Kessler | 160/381 |
| 4,042,288 | 8/1977 | Litchfield | 160/381 |
| 4,452,138 | 6/1984 | Bubley et al. | 101/127.1 |
| 4,702,783 | 10/1987 | Mason, III | 101/127.1 |

Primary Examiner—Edgar S. Burr
Assistant Examiner—Stephen R. Funk
Attorney, Agent, or Firm—Darby & Darby

[57] ABSTRACT

A screen printing frame comprises four extruded plastic frame members made of a material which is recyclable and resistant to attack by the inks and solvents used in a sreen printing process. Each of the frame members include transverse reinforcing webs dividing the frame member into four elongated channels. At each mitered junction of the frame, four L-shaped plastic connectors are inserted into the contiguous channnels of contiguous frame members and adhesively secured. The screen or mesh is suitably stretched and attached to the frame by means of an adhesive.

7 Claims, 1 Drawing Sheet

SCREEN PRINTING FRAME

This invention relates to screen printing frames and, more particularly, to a screen printing frame construction of a type which can be made from plastic and is therefore less susceptible to attack by the printing inks and reclaimers used in typical screen printing processes.

In a screen printing process, a screen is supported under tension on a rectangular screen. Maintaining proper, uniform tension on the screen is critical. Because of the high forces involved and the need for materials which will not deform (even minimally) under tension, all known screen printing frames are made from rigid, high strength materials such as wood or metal, particularly aluminum. Even slight deformation of the frame can impair print quality.

In a typical screen printing process, the printing media (inks) and solvents used (e.g., reclaimers) are highly corrosive. The repeated use of these chemicals in large quantities weakens the frame members and are the major limiting factor in the life of the frame. Moreover, the dimensional stability of both wood and aluminum is affected by temperature and humidity.

There are many plastic materials which are not subject to attack by the chemicals used in a screen printing process. Moreover, plastic has excellent dimensional stability under all temperature and humidity conditions likely to be encountered in screen printing, and the use of such plastic materials in the manufacture of a screen printing frame would be desirable for these and other reasons. However, despite the need, no one has yet produced an acceptable plastic screen printing frame with the stability and strength to function satisfactorily as a screen printing frame capable of retaining a screen under high uniform tension through repeated usage.

The principle object of this invention is to provide a screen printing frame which can be made of plastic and which will not deform when subjected to the high tension forces of the screen.

A further object of the invention is to provide a screen printing frame which can be manufactured of a plastic recyclable composition so that after its useful life has expired, the frame can be suitably recycled and used to manufacture other screen printing frames.

A further object of the invention is to provide a lightweight, relatively inexpensive screen printing frame which is not subject to attack by the inks and solvents used in typical screen printing processes.

Briefly, in accordance with the invention, a screen printing frame comprises four plastic hollow frame members each having mitered ends and at least one reinforcing web dividing its interior into two or more elongated interior channels. Two or more L-shaped plastic connector members are provided at each of the mitered junctions of the frame. Each leg of the connector frictionally engages an interior channel of two contiguous frame members. The frame is permanently assembled by gluing the connector members in place. Preferably, the screen is secured under tension to the frame by means of an ultraviolet curing adhesive.

IN THE DRAWINGS

DETAILED DESCRIPTION

Figure 1:
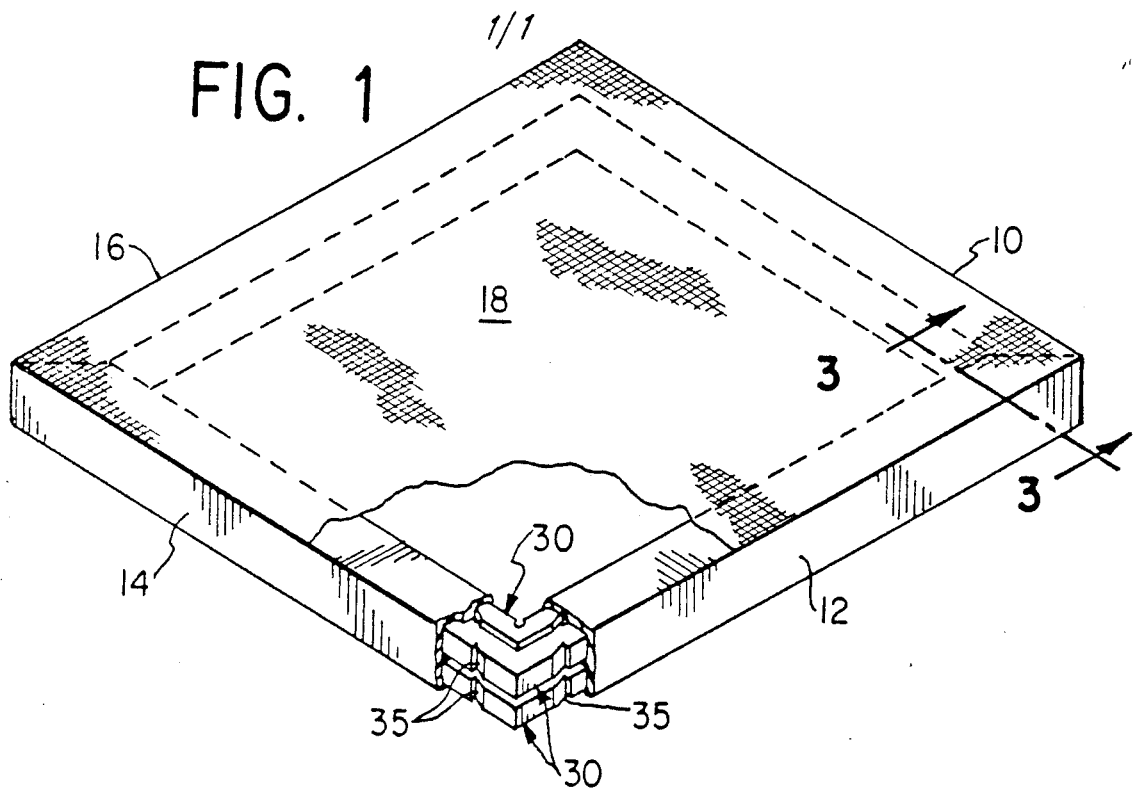
FIG. 1 is a perspective view showing a screen printing frame in accordance with the invention.

In FIG. 1, a screen printing frame in accordance with the invention includes four frame members 10, 12, 14 and 16, each of which is mitered at both ends. A screen 18 is attached to the frame members by a suitable adhesive as explained below.

In accordance with the invention, the frame members are made of a strong plastic material that will withstand repeated attack from the printing inks and solvents used in a screen printing process. A preferred material for this purpose is a carbon reinforced polycarbon plastic.

In the preferred embodiment, each of the frame members 10, 12, 14 and 16 is extruded in the form of a hollow member including two internal transverse, reinforcing webs 20 and 22 extending from side to side in both directions. The reinforcing webs 20 and 22 form four internal channels 24, 26, 28 and 29 which extend the length of the entire frame member.

Figure 3:
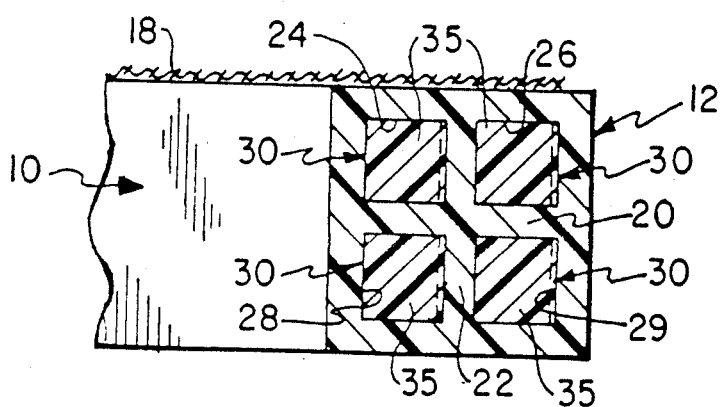
FIG. 3 is a cross-sectional view along the line 3—3 of FIG. 1 showing the cross-section of one of the frame members in accordance with a preferred embodiment of the invention.

After a suitable extrusion with the cross-section shown in FIG. 3 has been formed, the extrusion is cut to form the mitered frame members 10, 12, 14 and 16. The frame members are joined by means of four L-shaped connectors 30 at each junction. Each of the connectors is identical and includes legs 32 and 34 which frictionally engage the walls of adjacent channels 24 (for example) of two contiguous frame members. The three remaining connectors at any junction are inserted into the remaining pairs of channels 26, 28 and 29 of the contiguous frame members.

Figure 2:
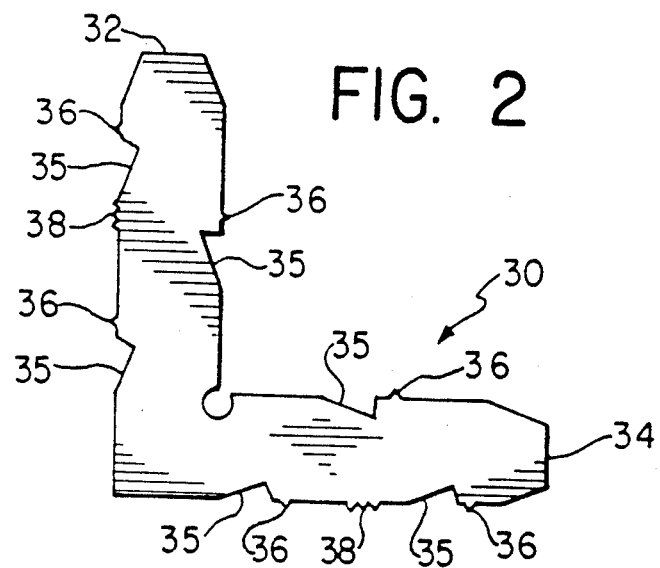
FIG. 2 is a plan view of one of the connector members.

The connectors 30 may be extruded from the same plastic material as the frame members 10, 12, 14 and 16. After extrusion in the shape shown in FIG. 2, the connectors are sliced to the appropriate size so that they can be received within the channels 24, 26, 28 and 29 of the frame members. Each of the legs 32 and 34 includes three sawtooth-like indentations 35 for retaining an appropriate adhesive which will form a permanent bond between the connector and the interior walls of the channels 24, 26, 28 or 30. To enhance the frictional engagement of a connector within a channel, six individual teeth 36 are provided on the surfaces of legs 32 and 34 and two series of teeth 38 are provided on the outer surfaces of the legs. These teeth 36 and 38 extend from the surface of the connector a sufficient distance so that they will tend to dig mechanically into the interior walls of the frame members to hold the frame rigidly together in proper alignment while the adhesive cures.

To manufacture a frame, the connectors 30 are dipped into an adhesive such as cyanoacrylate or an ultraviolet curing adhesive. The legs 34 of four connectors are then inserted into channels 24, 26, 28 and 29 of frame member 10 (for example). The frame member 12 is next pushed over the four legs 32 until the mitered surfaces of the frame members 10 and 12 are engaged. In the same way, frame member 14 is attached to frame member 12 and the frame completed by attaching the frame member 16 to both the frame members 10 and 14. The adhesive used tends to dissolve the plastic material of the frame members and the connectors so that an extremely tight bond is formed at each of the four frame junctions.

After the frame has been assembled and the adhesive cured, the screen or mesh 18 is attached to the frame. This may be done in a conventional fashion, for example, by stretching the screen to the proper tension or Newton value and attaching it to the top surface of the frame by means of an ultraviolet curing adhesive. The selection of adhesive is important since many adhesives will not bond satisfactorily to plastic. The mesh or screen should be stretched on a machine which gives a true parallel so that none of the mesh fibers runs at an angle since this may affect the finished print.

In the preferred embodiment, using a carbon reinforced polycarbon plastic, each of the frame members may be 1.5 inches square in cross-section with the walls and reinforcing webs 20 and 22 being approximately 3/16 inches thick. With these dimensions, the thickness of the connector and the width of each of the legs 32 and 34 may be 0.468 inches so that if the teeth 36 and 38 extend 0.01 inches from the surface, the teeth will dig firmly into the inner surfaces of the channels to form a secure friction fit.

Typically, in a screen printing process, the screens are subject to repeated usage. Because of the use of the plastic frame members and connectors, a frame manufactured in accordance with the invention will not wear out because of ink and/or solvent attack on the frame. However, in due course, the useful life of the frame will be exceeded since very small dimensional variations can result in unacceptable printing irregularities. A major benefit of the invention is the fact that the frame can be recycled.

For this purpose, it is contemplated that the frame will be returned to the frame manufacturer's facility. The screen will then be removed by cutting and the remaining adhesive and screen removed by abrasion, for example, sanding. The frame, including the four frame members 10, 12, 14 and 16 and the sixteen connectors (four at each junction), is then ground into pellets or powder and mixed with virgin plastic to form an extrudate. For optimal strength properties, about 25% to 30% of the recycled plastic should be contained in the new frame members although possibly as much as 35% of the recycled plastic may be used in some situations. Thus, the invention provides an improved frame construction in terms of its ability to withstand ink and solvent attack and one which presents no disposal problems after its useful life has ended.

What is claimed is:

1. A screen printing frame comprising:
   four plastic hollow frame members, each said frame member having two mitered ends and at least one reinforcing web dividing its interior space into at least two elongated interior channels;
   at least two plastic connector members at each mitered junction of said frame, each connector member including two legs forming an L-shape with each leg frictionally engaging an interior channel of two contiguous frame members;
   an adhesive for securing the legs of each of said connector members in said interior channels;
   a printing screen; and
   an adhesive for securing said printing screen to said frame members.

2. A screen printing frame according to claim 1, wherein each of said hollow frame members includes two transverse reinforcing webs dividing its interior into four elongated interior channels and wherein four plastic connector members are provided at each mitered junction of said frame with the legs of each connector member frictionally engaging an interior channel of two contiguous frame members.

3. A screen printing frame according to claim 2, wherein said frame members are extruded from a carbon reinforced polycarbon plastic and said second named adhesive is an ultraviolet curing adhesive.

4. A screen printing frame according to claim 3, wherein said connectors are made of carbon reinforced polycarbon plastic.

5. A screen printing frame according to claim 2, wherein at least 25% of the plastic used to manufacture said frame members is recycled plastic.

6. A screen printing frame according to claim 2, wherein each of said connectors includes protruding teeth on each of its legs to frictionally engage the inner surface of an interior channel and grooves for retaining said first named adhesive.

7. A screen printing frame according to claim 6, wherein said first named adhesive dissolves at least a portion of the hollow frame member and connector member.

* * * * *